United States Patent
Schickel-Zuber et al.

(10) Patent No.: US 7,873,616 B2
(45) Date of Patent: Jan. 18, 2011

(54) METHODS OF INFERRING USER PREFERENCES USING ONTOLOGIES

(75) Inventors: Vincent Schickel-Zuber, Lausanne (CH); Boi Faltings, Preverenges (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 444 days.

(21) Appl. No.: 11/775,106

(22) Filed: Jul. 9, 2007

(65) Prior Publication Data

US 2008/0010272 A1  Jan. 10, 2008

Related U.S. Application Data

(60) Provisional application No. 60/819,290, filed on Jul. 7, 2006.

(51) Int. Cl.
  *G06F 7/00* (2006.01)
  *G06F 17/30* (2006.01)
(52) U.S. Cl. .................. 707/705; 707/732; 707/734; 707/758
(58) Field of Classification Search .......... 707/999.005, 707/705, 732, 734, 758
See application file for complete search history.

(56) References Cited

U.S. PATENT DOCUMENTS 7,644,052 B1 * 1/2010 Chang et al. .................. 706/45

2003/0217052 A1 * 11/2003 Rubenczyk et al. ............. 707/3
2005/0240583 A1 * 10/2005 Li et al. ........................ 707/7
2006/0074836 A1 * 4/2006 Gardner et al. ................ 706/60
2007/0033261 A1 * 2/2007 Wagner et al. ............... 709/217

FOREIGN PATENT DOCUMENTS

WO  PCT/EP2004/052822  *  5/2004

OTHER PUBLICATIONS

"Capturing knowledge of user preferences with recommender systems", by Stuart Edward Middleton, A thesis submitted for the degree of Doctor of Philosophy in the Faculty of Engineering and Applied Science, Department of Electronics and Computer Science, University of Southampton, May 2003.*
Koh et al., "An information-theoretic approach for ontology-based interest matching," in Proc. Workshop on Ontology Learning (OL '01), Seattle, Wash, USA, Aug. 2001.*
Decker, et al., "ONTOBROKER: Ontology Based Access to Distributed and Semi-Structured Information", Kluwer Academic Publisher, https://eprints.kfupm.edu.sa/55778/1/55778.pdf, pp. 1-20, Sep. 25, 1998.

* cited by examiner

*Primary Examiner*—Jay A Morrison
(74) *Attorney, Agent, or Firm*—Perkins Coie LLP

(57) ABSTRACT

Methods of inferring user preferences using ontologies use ontology structure based similarity and an inference mechanism in defining ontology filtering (OF). Items are recommended to users by identifying items that the users may prefer, but may not have been aware of. This is performed by computing personalized scores for concepts and selecting an instance having a highest score.

32 Claims, 10 Drawing Sheets

300

METHODS OF INFERRING USER PREFERENCES USING ONTOLOGIES

RELATED APPLICATIONS

This application claims priority to U.S. Provisional Patent Application No. 60/819,290 filed Jul. 7, 2006, and entitled "Method of inferring user preferences using ontologies," by Vincent Schickel-Zuber & Boi Faltings, which is incorporated herein by reference.

BACKGROUND

Recommendation systems are tools that help people find items on the internet by filtering information so as to show only the most suitable items that match a person's needs or preferences. The recommendation problem is the problem of finding the items that most accurately match the user's preferences. A particular recommendation technique is useful if it can both accurately predict a user's preferences and also make recommendations that are novel (i.e., a recommendation of an item that is already very popular gives nothing new or valuable to a user). Two widely used recommendation techniques are collaborative filtering (CF) and preference-based approach (PBA).

Collaborative filtering (CF) recommends products to users based on the experience of like-minded groups of users under the assumption that similar users like similar objects. Therefore, the ability to recommend items depends on the capability of successfully identifying the set of similar users. CF does not build an explicit model of a user's preferences, but rather preferences remain implicit in the ratings that a user gives to some subset of products. Although CF is currently the most popular recommendation technique, it suffers from a number of drawbacks, including the cold start problem, where a minimum number of ratings must be known in order to find the right neighborhood of similar users, the first rater problem, and scalability problems.

PBA is another widely used technique and, unlike CF, requires the user to input explicit preferences for particular attributes of a product. Preferred products can then be predicted even if the set of alternatives is extremely large and/or volatile. This technique does not suffer from cold start, latency, or scalability problems since recommendations are based only on the individual user's data. The main drawback of PBA, however, is that the user needs to express and input potentially a highly complex preference model, requiring a large number of interactions and placing a higher cognitive load on the user.

The foregoing examples of the related art and limitations related therewith are intended to be illustrative and not exclusive. Other limitations of the related art will become apparent to those of skill in the art upon a reading of the specification and a study of the drawings.

SUMMARY

The foregoing embodiments and aspects thereof are described and illustrated in conjunction with systems, tools, and methods that are meant to be exemplary and illustrative, not limiting in scope. In various embodiments, one or more of the above described problems have been reduced or eliminated, while other embodiments are directed to other improvements.

Ontology Filtering ("OF"), recommends objects to a user based on the user's preferences and an inference mechanism. The inference mechanism infers missing user preferences by transferring the preferences of the closest concept. To find the close concepts a similarity metric is used. The similarity metric measures the similarity between concepts in an ontology. The inference mechanism infers a user's unknown preference for a concept, by using an a-priori score calculated solely from implicit information contained in the structure of the ontology. This inference mechanism allows the known score or preference value of a particular concept to be propagated, or extrapolated, to predict preference values for the other concepts within the ontology. On the other hand, the similarity metric, called Ontology Structure based Similarity ("OSS"), allows recommender systems to locate close concepts with users' preferences. A novelty metric can be used to determine the degree to which recommendations are non-obvious, i.e., the degree to which a recommendation provides a user with interesting, new, valuable, or useful information. The result is a recommendation to the user that both accurately matches the user's preferences and also provides novel recommendations to the user.

BRIEF DESCRIPTION OF THE DRAWINGS

Embodiments of the inventions are illustrated in the figures. However, the embodiments and figures are illustrative rather than limiting; they provide examples of the inventions.

DETAILED DESCRIPTION

In the following description, several specific details are presented to provide a thorough understanding of embodiments of the inventions. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

The recommendation problem is the problem of finding items that best match a user's preferences. In accordance with the inference mechanism ontology filtering (OF) recommends products unknown to a user by finding a high score in accordance with the inference mechanism to solve a problem of recommending a product to a user when very little data is known.

An ontology can be defined as an acyclic diagram that represents a hierarchy of concepts and descendants (called sub-concepts), and the interrelation of these concepts and sub-concepts to one another. A node symbolizes a concept or sub-concept, while an edge symbolizes the relation between two concepts or sub-concepts. In the recommendation system context, a concept is a group of items with the same features. Items in the different sub-concepts are distinguished by differences in certain features.

In the recommender context a concept represents a group of items with the same features. Consequently items in different sub-concepts are distinguished by differences in certain features. However, these are usually not made explicit in an ontology. Concretely, we see a feature as a restriction on a property or in a combination of properties that differentiates a concept from its parent. For example the subclasses of red and white wines are distinguished by a combination of features which include color and aspects of taste.

Figure 1:
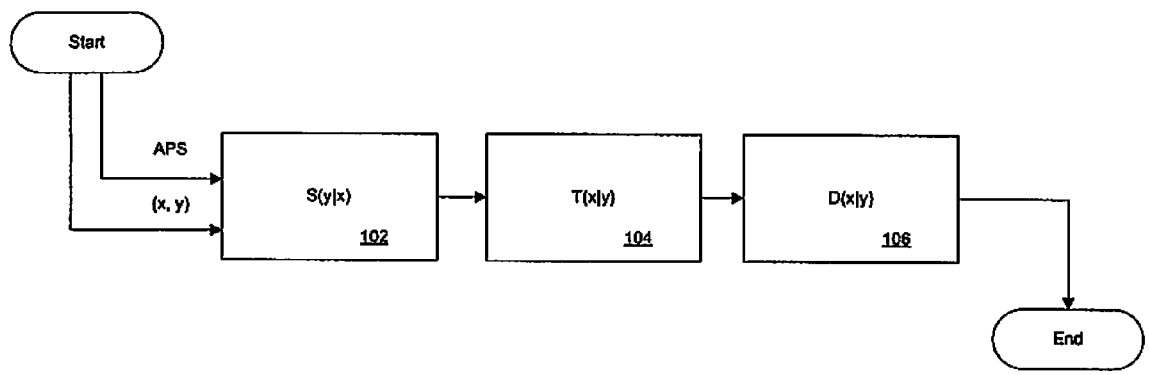
FIG. 1 depicts a flowchart of an example of a method for computing the similarity between concept x and concept y.

FIG. 1 depicts a flowchart 100 of an example of a method for computing the similarity between concepts x and y under OSS. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Calculating an a-priori Score (APS)

In the example of FIG. 1 the flowchart starts at module 102 with calculating the score of a concept S(y|x), based on an a-priori score (APS) assigned to each of concepts x and y of an ontology. Module 102 is explained in more details in FIG. 8. In predicting a score S to assign to a particular item in a concept using the ontology structure based similarity approach (OSS), the following three general rules should be followed:

R1: The score depends on the features of the item. Thus, all instances of the same concept will have the same score.

R2: Each feature contributes independently to the score, i.e., the score can be modeled as the sum of the scores assigned to each feature. Each feature makes a non-negative contribution to the score.

R3: Features that are unknown make no contribution to the score. Thus, the score attached to a concept can be seen as a lower bound of the score that items belonging to that concept might have.

An APS score represents an estimator of a lower bound on how much a concept is liked or preferred, without using any information from a particular user. It is calculated based on the location of the concept within the ontology, and represents the expected score of each concept for the average user. This score is used to estimate constants that determine how actual user scores, once known more precisely, propagate through the ontology to determine the scores of other, unknown concepts in the ontology.

Thus, in a situation with two concepts, x and y, where only the score for x is known, a score for y can be predicted by propagating, or extrapolating, the known score of x to y, assuming the two concepts are connected in some way. Using the a-priori score, it is possible to calculate a ratio of features common to both x and y and, from such ratio, estimate the score of y.

As no information is yet known about a user, it is assumed that all items have an a-priori score uniformly distributed between 0 and 1, where 0 means maximally disliking or disfavoring an item and 1 means maximally liking it. Obeying R3, the score of a concept is the greatest lower bound of the scores of its items. Thus, the probability that the score of a concept c is greater than the threshold x, (S(c)>x), is equal to $(1-x)^{n+1}$, where n is the number of sub-concepts, or descendants, of c.

The probability distribution of the score for a concept c is $P(S(c) \leq x) = 1 - (1-x)^{(n+1)}$, with the following density function:

$$f_c(x) = \frac{d}{dx}(1-(1-x)^{n+1}) = (n+1) \cdot (1-x)^n \quad (1)$$

To compute the expected score of the concept c, E(c), the above Equation 1 is integrated as shown below in Equation 2:

$$E(c) = \int_0^1 x f_c(x) dx = (n+1) \int_0^1 x(1-x)^n dx \frac{1}{n+2} \quad (2)$$

The expected score E(c) dictates that the expected score of a concept c will be inversely proportional to the number of its descendants+2. Following Equation 2, the a-priori score of a concept c with $n_c$ descendants is defined in Equation 3 as:

$$APS(c) = \frac{1}{n_c + 2} \quad (3)$$

The a-priori score defined in Equation 3 implies that the leaves of the ontology will have an APS equal to ½, which is equal to the mean of a uniform distribution between 0 and 1. The lowest values will be found at the root, meaning that traveling up the ontology, concepts become more generalized, and therefore APS decreases. In an economic context, this means that a user is less willing to pay for general concepts, since there is more of a chance that it subsumes items that the user dislikes.

It should be noted that the a-priori score represents an estimate without considering a particular user. When a user's preferential score is known a more exact value can be calculated.

Propagating a Score Through an Ontology

Figure 2:
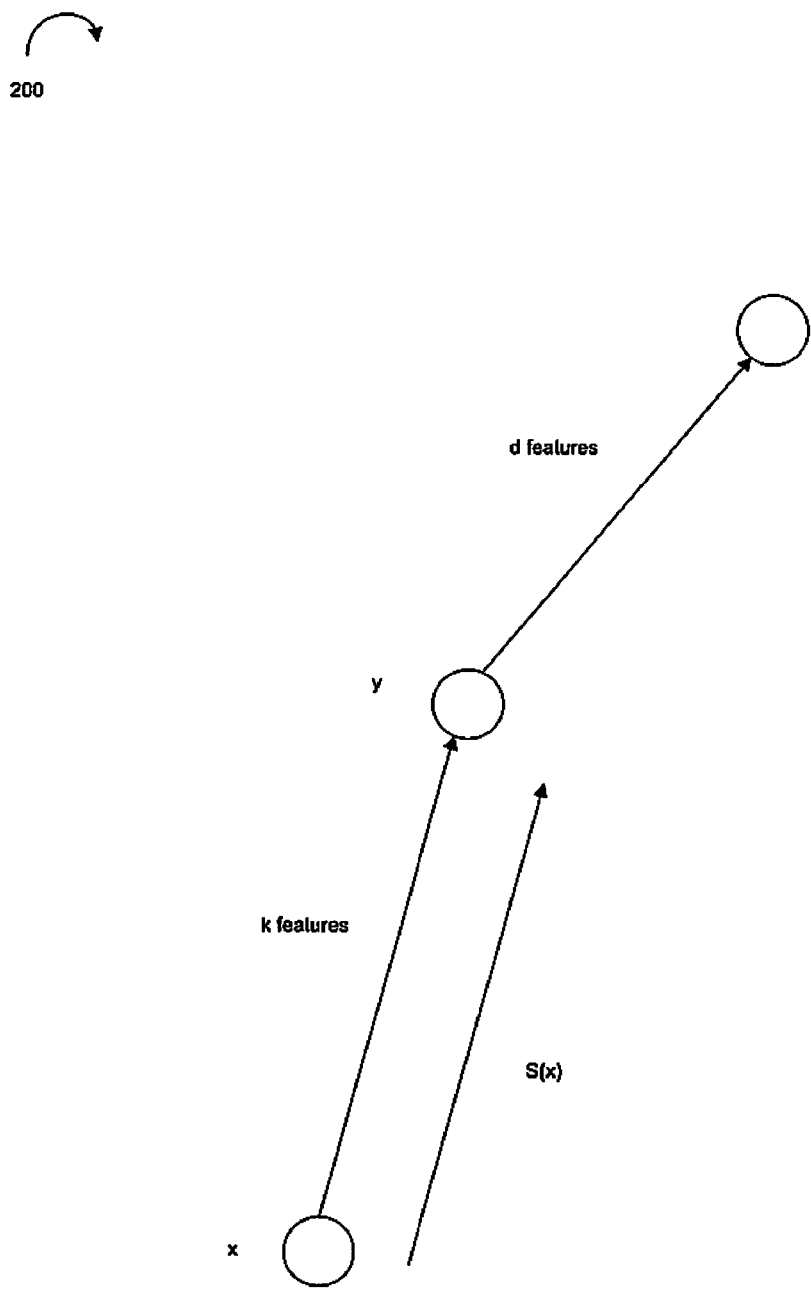
FIG. 2 depicts an example of an upward inference.
Figure 3:
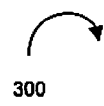
FIG. 3 depicts an example of a downward inference.
Figure 3:
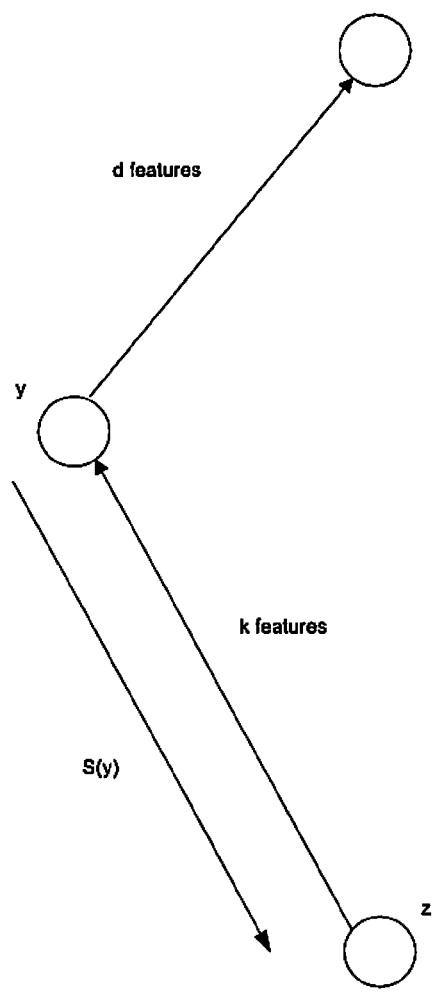
Figure 4:
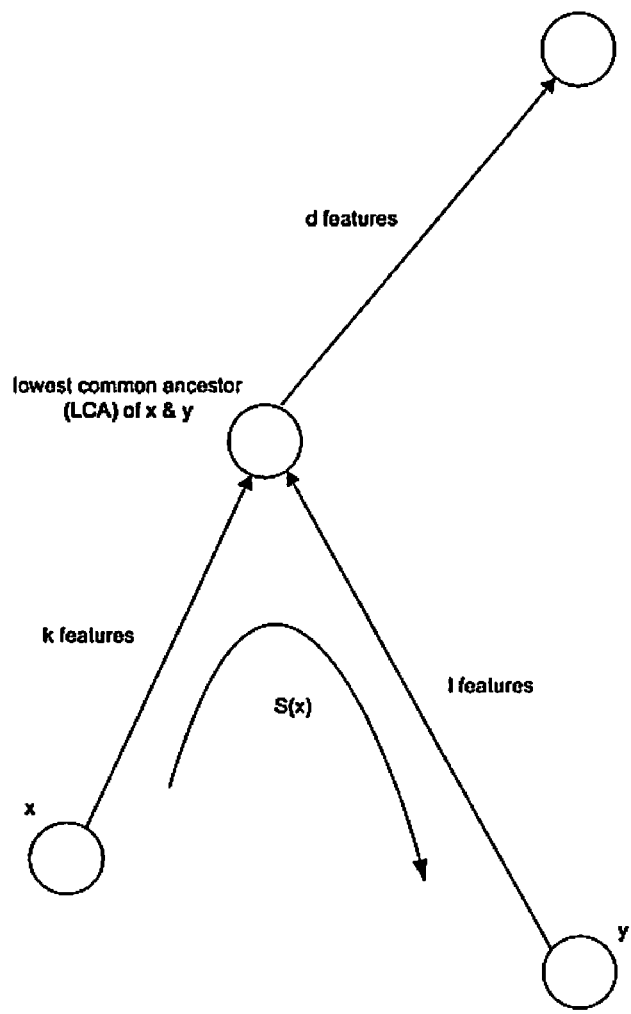
FIG. 4 depicts an example of an upward & downward reference.
Figure 8:
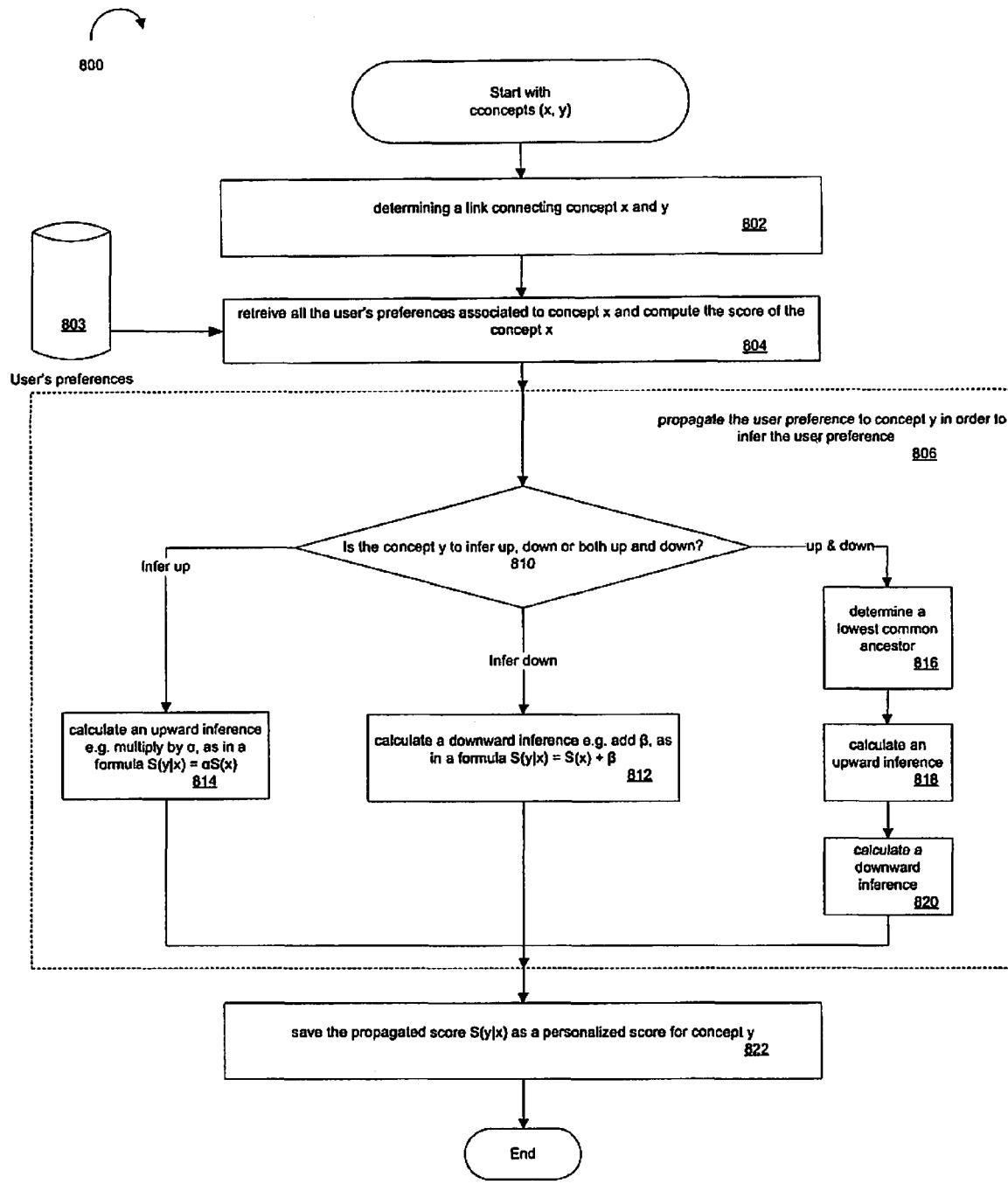
FIG. 8 depicts a flowchart of an example of a method for inferring the preference of an unknown concept y from the known preferences on concept x.

The present discussion continues with regard to FIG. 1, module 102, additionally, reference to FIG. 8, and reference FIG. 2-4 may assist the reader.

The a-priori score represents an estimate of how much a concept is liked or preferred, without using any information from a particular user. Once a user's scores or preference values are known more precisely, a personalized score or preference value can be derived for other concepts in the ontology by propagation.

As an example, in a situation with two concepts x and y, only the score for x, S(x), is known. To propagate the score from x to y, there must be some interrelation or chain between x and y. This can occur when y is a parent of x (FIG. 2), when x is a parent of y (FIG. 3), or when x is neither a parent nor a child of y (FIG. 4). To minimize the amount of propagation, the chain is constructed through a lowest common ancestor, LCA. In a tree graph, the LCA is the closest upward reachable node shared by x and y. In a directed acyclical graph, there can be several LCA nodes. Fortunately, this number tends to be small in reality, as most concepts have only a few parents.

The following heuristic method is used to select which LCA to use to propagate the score. For each LCA node n, its depth d(n) (the distance of the longest path between the root and n) and its reinforcement r(n) (the number of different paths leading to n from x and y) are calculated. The LCA with the highest value of $r(n)*2^{d(n)}$ is selected. This heuristic is based on the idea that while general the amount of propagation should be limited, if a node appears in many different connections between concepts x and y, it can become more meaningful as a connection.

Upward Inference—when y is a Parent of x

The present discussion continues with regard to FIG. 1, module 102, additionally, reference to FIG. 2 as well as FIG. 1 may assist the reader with an upward inference.

When y is the $k^{th}$ parent of x, both concepts x and y have d features in common, but the concept x has an extra k features that differentiate it from its ancestor. According to R1, the score of a concept depends on the features defining that concept. In other words, the score of y can be estimated based on the known score of x, S(y|x), by looking at the ratio of features they have in common. Formally, S(y|x) is defined as $$S(y|x) = \alpha S(x) \quad (4)$$

where $\alpha$ is the coefficient of generalization that contains the ratio of features in common which are liked according to their respective distribution. $\alpha$ is unknown in this case, but can be estimated using the a-priori score captured by the concepts in the ontology. Thus, $\alpha$ can be estimated as the ratio of a-priori scores:

$$\alpha = \frac{APS(y)}{APS(x)} \quad (5)$$

Downward Inference—when z is a Descendant of y

The present discussion continues with regard to FIG. 1, module 102, additionally, reference to FIG. 3 as well as FIG. 1 may assist the reader with a downward inference.

When z is the $l^{th}$ descendant of y, it is necessary to consider the score of each new feature independently. Formally, it means that S(z|y) may be defined as follows:

$$S(z|y) = S(y) + \beta \quad (6)$$

where $\beta$ is the coefficient of specialization that contains the score of the features contained in concept y but not in x. Again, $\beta$ can be estimated by using the a-priori score:

$$\beta = APS(y) - APS(z) \quad (7)$$

Upward and Downward Inference—when y is Neither a Parent Nor a Descendant of x

The present discussion continues with regard to FIG. 1, module 102, additionally, reference to FIG. 4 as well as FIG. 1 may assist the reader in understanding an upward and downward inference.

When there is no direct path between concepts x and y, in order to propagate the score of x, it is necessary to carry it up to the lowest common ancestor of x and y, $LCA_{x,y}$, and then down to the concept y. Furthermore, and because the chain between concepts x and y is not a path, it is assumed that x and y are independent (the same reasoning is done on Bayesian Networks if no hard information is known about $LCA_{x,y}$). Thus, and using the result contained in Equations 4 and 6, the score can be decomposed as follows:

$$S(y|x) = \alpha S(x) + \beta \quad (8)$$

Transfer of Score

In the example of FIG. 1, the flowchart continues to module 104 with calculating the amount of score transferred between y and x, T(x,y).

The OSS approach assumes that the similarity between two concepts x and y is correlated to the amount of score being transferred between them. Thus, if the entire score can be transferred from one concept to another, this would mean that the concepts share exactly the same features. The transfer of score from a concept x to y, T(x, y), is defined as the amount of score being transferred from x to y, i.e.:

$$T(x, y) = \frac{S(y|x)}{S(x)} \quad (9)$$

Using Equations 4 and 6, the transfer of score between concepts x and y can be further decomposed. For upward propagation, $T(x, y) = \alpha$. For downward propagation, $$T(y, z) = 1 + \frac{\beta}{S(x)} \quad (10)$$

When S(x) is unknown, under the assumption that the score of any concept is uniformly distributed between 0 and 1, the expected score of a concept is in fact equal to ½. Thus, T(y, z) can be approximated as $1+2\beta$.

When judging the similarity of two concepts x and y, the transfer of score from x and y should not attempt to predict the expected value of the score assigned to y, but rather a lower bound on it. For upward propagation, $\alpha$ correctly reflects this, as the a-priori score of an ancestor is already constructed as the lower bound on scores of its descendants. For downward propagation, on the other hand, $\beta$ reflects the translation from the lower bound to the expected value at the descendants, and so in order to produce a lower bound, the relation must be inverted. Thus, for downward propagation:

$$T(y, z) = \frac{1}{1 + 2\beta} \quad (11)$$

When the transfer of score goes from concept x to y through the lowest common ancestor z (upward and downward inference), T(x, z) is defined as S(z|x)/S(x). Furthermore, Equation 10 implies that S(x)=S(y|x)/T(x, y), while S(y|x)≦S(y). Thus, the transfer T(x, z) becomes the following in equality:

$$T(x, z) \geq \frac{S(z|x) T(y, z)}{S(y)} \quad (12)$$

For downward transfer, according to Equation 10, S(y) is in fact equal to S(z|y)/T(y, z), and S(z|x)≦S(z|y) as S(y|x)≦S(y). Thus, the expression S(z|x)/S(z|y)≧S(z|x)/S(z|x)=1. Subsequently, the transfer T(x, z) can be bounded by the following expression:

$$T(x,z) \geq T(x,y)T(y,z) \quad (13)$$

Calculating the Similarity Metric

In the example of FIG. 1, the flowchart continues to module 106 with calculating a distance function between two concepts x and y. The Ontology Structure based Similarity, $sim_{oss}$(x, y), of two concepts x and y is defined as 1−D(x, y), where $D(x, y)$ is the distance measure between x and y. A distance measure should satisfy the following axioms:

Identity: $D(x,y)=0 \leftrightarrow x=y$ normalization: $0 \leq D(x,y) \leq 1$ triangle inequality: $D(a,c) \leq D(a,b)+D(b,c)$ It is otherwise customary to also include a symmetry axiom; however, under the OSS approach distance can be asymmetric, so such an axiom is not included.

In principle, the distance between two concepts can grow arbitrarily large. Fortunately, the topology of the ontology implies that the biggest distance corresponds to the longest path between two leaf concepts that goes through the root. Furthermore, it is subject to the principle of self-similarity: increasing a transfer d by δ is equally important as increasing a distance e=yd by yδ. By defining $$D(a, b) = -\frac{\log(T(a, b))}{\max D} \quad (14)$$

where maxD is the distance of the longest path in the ontology, a distance measure is obtained that satisfies all the stated axioms. Using Equations (11) and (13), the distance measure can be further decomposed as follows:

$$D(x, z) = -\frac{\log(1 + 2\beta) - \log(\alpha)}{\max D} \quad (15)$$

Obtaining the Novelty Metric

Using the OSS approach, it is possible to infer a user's unknown preference values for the concepts within an ontology. To recommend the best N items to the user (the top-N strategy), it is necessary to select N items from the concepts that have the highest score or preference value. The accuracy of a prediction is usually not enough to build a good recommendation system. The ability to make non-obvious recommendations is required to be truly useful to the user, i.e., a recommendation of a very popular item gives no new or valuable information to a user. Novelty, a metric that measures the degree to which a recommendation is non-obvious, is thus a new dimension for analyzing recommendation systems.

The following novelty metric measures the number of correct recommendations made by an algorithm a that are not present in the recommendations made by a reference algorithm b:

Novelty$(r_a|r_b)=(|cr_a|-|cr_a \cap cr_b|)/N$ (16)

$r_a$ are the top-N recommendations made by the algorithm a, and $cr_a$ are the correct recommendations contained in $r_a$, i.e., liked by the user. $r_b$ are the top-N recommendations made by a reference algorithm b. $cr_b$ are the correct recommendations made by the reference algorithm b.

Reference Figures

FIG. 2 depicts a diagram 200 of an example of an upward inference. The example depicted may be helpful in reference to equations (4)-(8).

FIG. 3 depicts a diagram 300 of an example of a downward inference. The example depicted may be helpful in reference to equations (4)-(8).

FIG. 4 depicts a diagram 400 an example of an upward & downward reference. The example depicted may be helpful in reference to equations (4)-(8).

Figure 5:
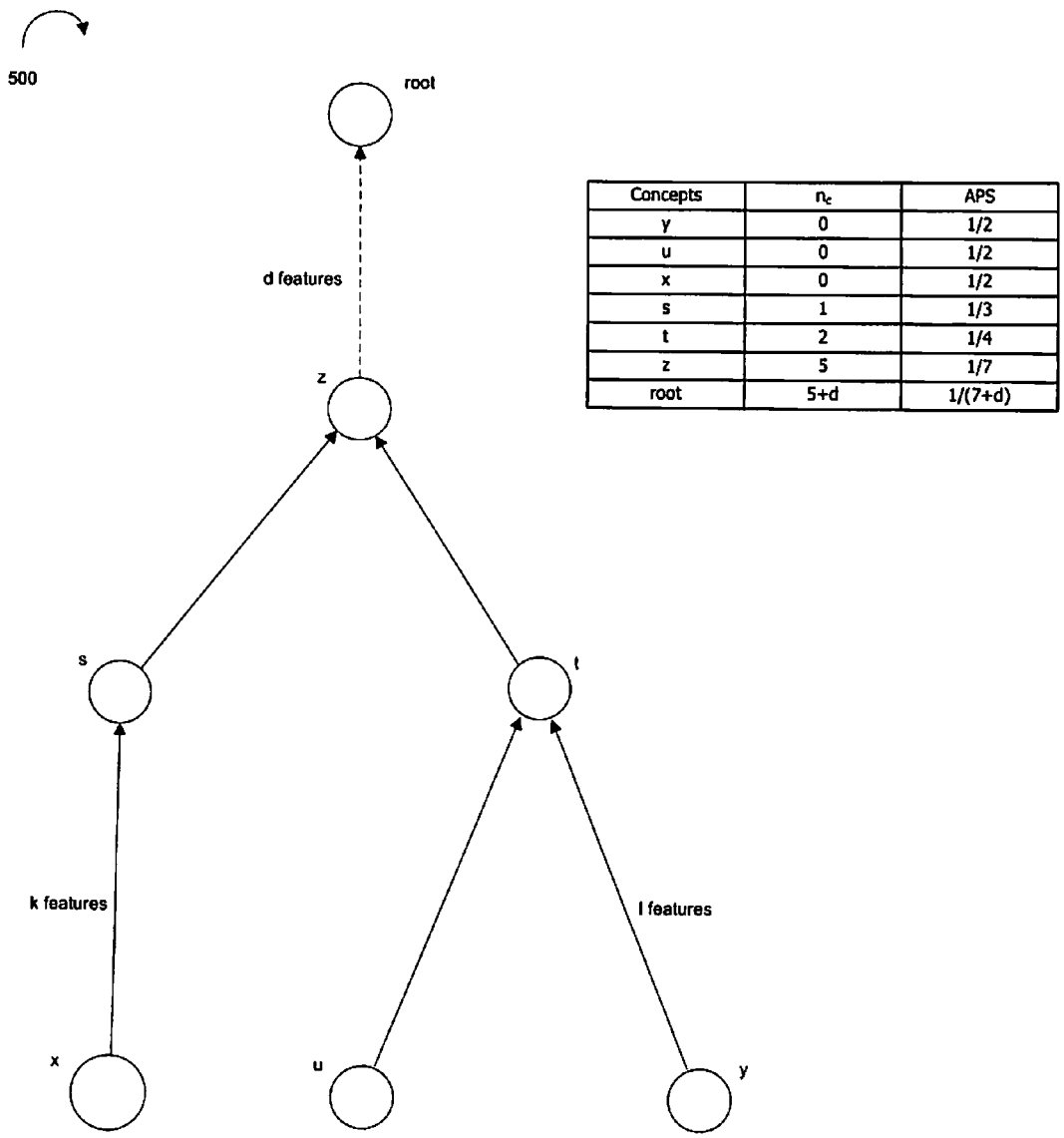
FIG. 5 depicts an example of a simple ontology and its corresponding a-priori score.

FIG. 5 depicts a diagram 500 of an example of a simple ontology and its corresponding a-priori scores. Diagram 500 is intended to be exemplary only, and is not limiting as there are many ways to construct a directed acyclic graph in accordance with these teaching.

Generating a Set of Ontologies

Figure 6:
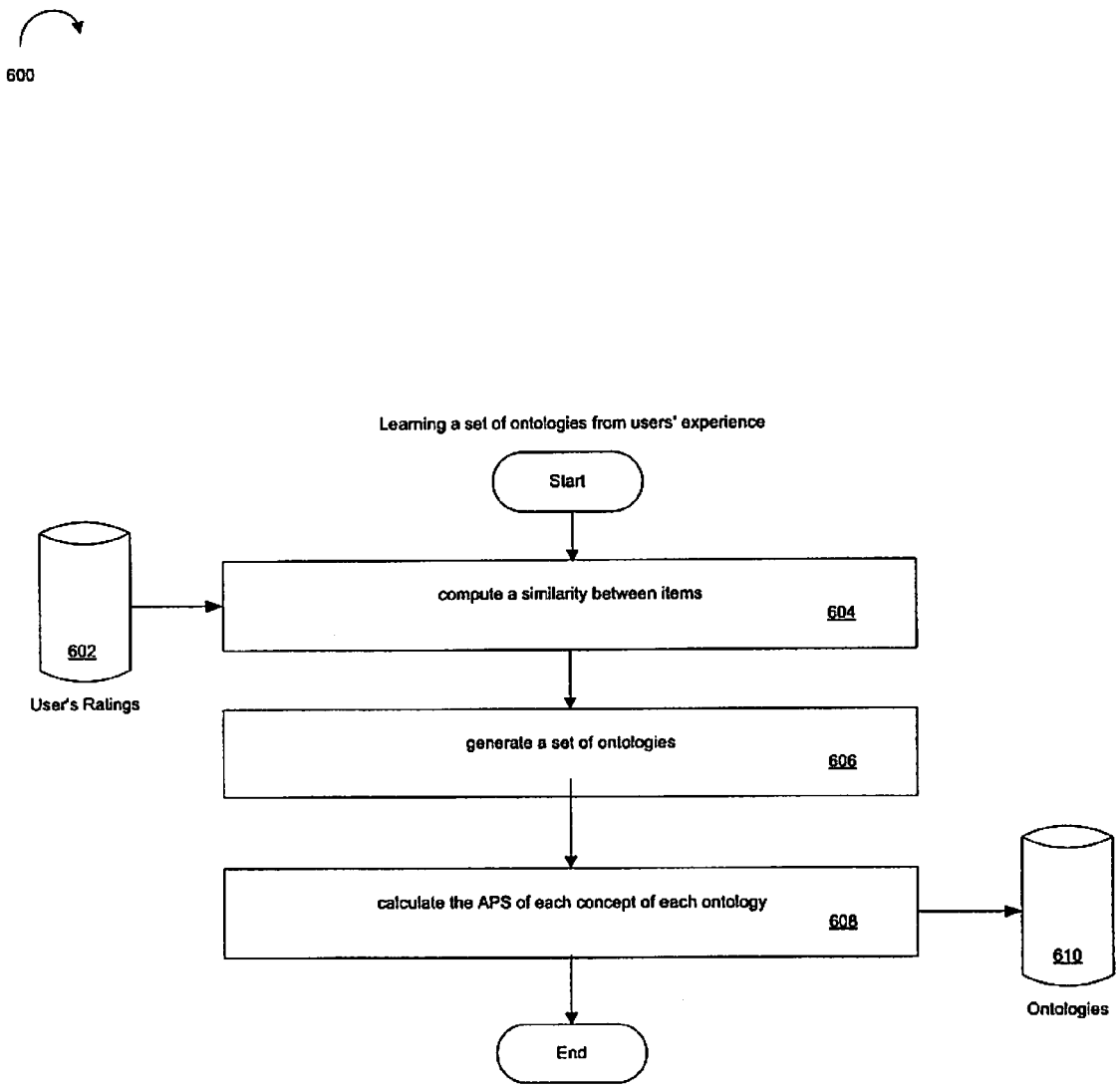
FIG. 6 depicts a flowchart of an example of a method for generating a set of ontologies from past users' experience.

FIG. 6 depicts a flowchart 600 of an example of a method for generating a set of ontologies from users' past experience. The method is organized as a sequence of modules in the flowchart 600. However, it should be understood that these and modules associated with other methods described herein may be reordered for parallel execution or into different sequences of modules.

In the example of FIG. 6, the flowchart 600 starts at module 604 that compute the pair wise similarities between all the items available in the database. Such similarities can be computed using the adjusted cosine metric or Pearson-r correlation from a database containing the experience of previous users on the items (module 602).

In the example of FIG. 6, the flowchart 600 continues to module 606 with generating the ontologies. This can either be done manually by experts of can be learnt using hierarchical clustering algorithms over the data learnt by model 604.

In the example of FIG. 6, the flowchart 600 continues to module 608 with calculating a-priori score at each node of the ontology. Here, the score may be calculated as an APS using formula (3): $1/(n_c+2)$ as derived in formulas (1)-(3) above.

In the example of FIG. 6, the flowchart 600 then saves the learnt ontologies along with the APSs in a database (module 610).

Selecting the Best Ontology for a User

Figure 7:
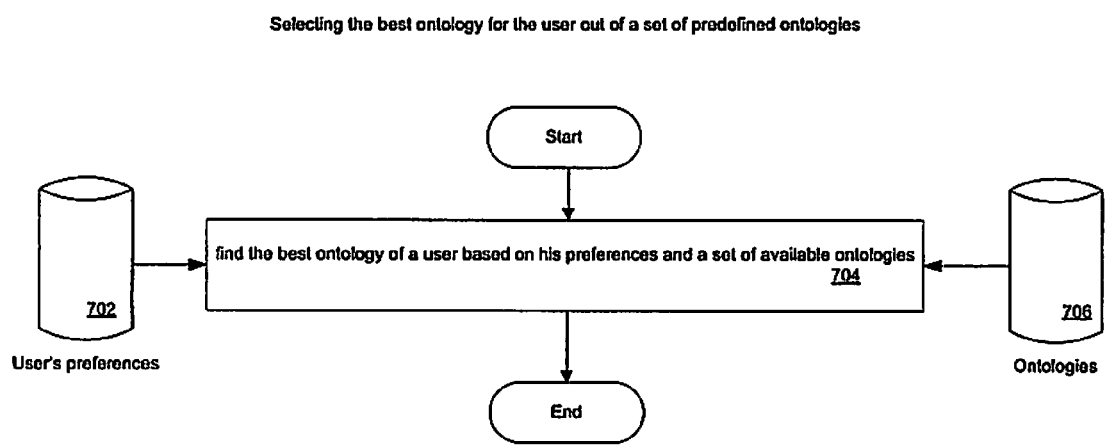
FIG. 7 depicts a flowchart of an example of a method for selecting the best ontology for a given user.

FIG. 7 depicts a flowchart 700 of an example of a method for selecting the best ontology based on the user's preferences. The method is organized as a sequence of modules in the flowchart 700. However, it should be understood that these and modules associated with other methods described herein may be reordered for parallel execution or into different sequences of modules.

In the example of FIG. 7, the flowchart 700 starts at module 704 with selecting the best ontologies from module 706 using the user's preferences stored in module 702. This selection can be guided by minimizing the OSS distance between the concepts representing liked items and disliked ones.

Inferring the Preference of an Unknown Concept

FIG. 8 depicts a flowchart 800 of an example of a method for inferring a missing preference (score) of a concept y from a concept x on which the user has expressed some preferences. The method is organized as a sequence of modules in the flowchart 800. However, it should be understood that these and modules associated with other methods described herein may be reordered for parallel execution or into different sequences of modules.

In the example of FIG. 8, the flowchart 800 starts at module 802 with determining a link between concepts x and y.

In the example of FIG. 8, the flowchart 800 continues to module 804 for extracting the user's preference associated to concept x and computing the score of that concept. The score of the concept can be computed as the average of all the user's ratings of the instances of this concept. This may be retrieved from a database of user preferences as depicted by module 803.

The flowchart then continues to module 806 with propagating the score to concept y to infer the user preference that concept in accordance with equations (4)-(8) as discussed above. Contained within module 808 are modules 810, 812, 814, 816, 818, and 820. The organization of modules within module 808 is for illustrative purposes only, and is not intended to be limiting; the modules could be recombined and reorganized, and need not be placed within a module. The modules contained within module 808 could be executed once or more than once, and propagation of scores through an ontology could involve repeating some or all of the modules contained in module 808 for multiple nodes.

The flowchart then continues to decision module 810 with deciding: is the node to infer up, down, or both up and down? If the node to infer is up then the flowchart continues to module 814 with calculating an upward inference e.g. multiply by $\alpha$, as in a formula $S(y|x)=\alpha S(x)$ in accordance with equation (4)-(5).

If the node to infer is down then the flowchart continues to module 812 with calculating a downward inference e.g. add $\beta$, as in a formula $S(y|x)=S(x)+\beta$ in accordance with equations (6)-(7).

If the node to infer is both up & down then the flowchart continues to module 816 with determining a lowest common ancestor (LCA) as in the discussion of equation (8). The flowchart then continues to module 818 with calculating an upward inference in accordance with the discussion of with equation (4)-(5). The flowchart then continues to module 420 with the calculation of a downward inference in accordance with the discussion of equations (6)-(7).

From module 812, module 814, or module 820, the flowchart exits module 808 to continue at module 822 with saving the propagated score s(y|x) as a personalized score for the concept y.

Recommending a Set of N Product to a User from a List of I Products

Figure 9:
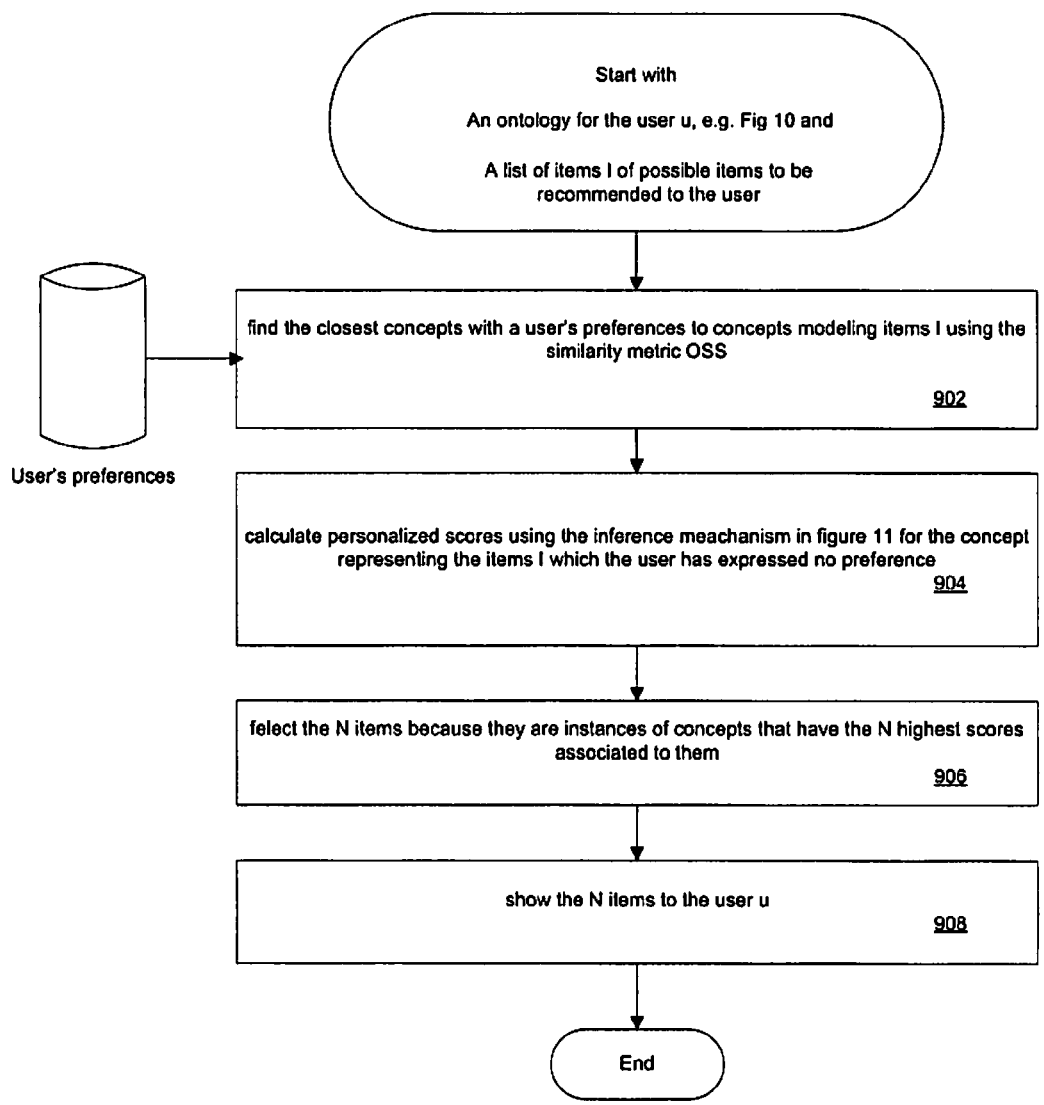
FIG. 9 depicts a flowchart of an example of a method for selecting a set of N items from a set of items I based on the user's preferences.

FIG. 9 depicts a flowchart 900 of an example of a method for recommending a set of N products to a user from a list of I products. The method is organized as a sequence of modules in the flowchart 900. However, it should be understood that these and modules associated with other methods described herein may be reordered for parallel execution or into different sequences of modules.

In the example of FIG. 9, the flowchart 900 starts at module 902 with finding the closest concept with a user's preferences to the concepts without any that model the items I. The close concept can be found by minimizing the distance between pairs of concept, where the distance can be computed using OSS.

In the example of FIG. 9, the flowchart 900 continues to module 904 for inferring the concepts without score from the closest one with some score. This inference can be performed with the inference mechanism in FIG. 8.

In the example of FIG. 9, the flowchart 900 continues to module 906 for selecting the N products that are instance of the concepts with the N highest score.

In the example of FIG. 9, the flowchart 900 continues to module 908 for showing the selected N products to the user.

Recommending a Set of N Product to a User from the Neighborhood Concepts

Figure 10:
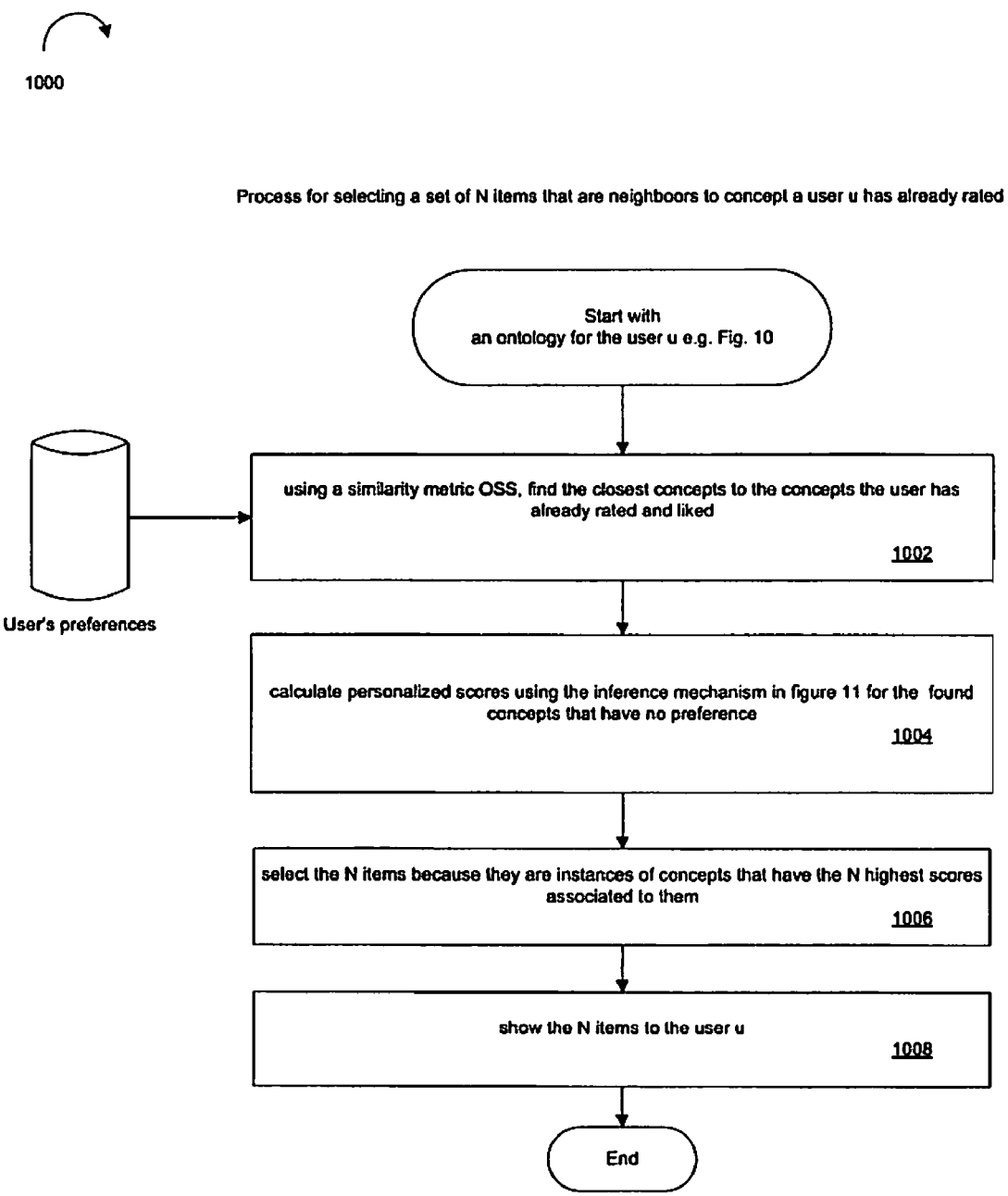
FIG. 10 depicts a flowchart of an example of a method for selecting a set of N neighboring items based on the user's preferences.

FIG. 10 depicts a flowchart 1000 of an example of a method for recommending a set of N products to a user simply by looking at the close concepts a user has liked. The method is organized as a sequence of modules in the flowchart 1000. However, it should be understood that these and modules associated with other methods described herein may be reordered for parallel execution or into different sequences of modules.

In the example of FIG. 10, the flowchart 1000 starts at module 1002 that finds the neighborhood of concepts that the user has already rated and liked. The neighborhood is formed by using OSS in order to estimate close concepts.

In the example of FIG. 10, the flowchart 1000 continues to module 1004 for inferring the concepts of the neighborhood from its closest one with some score. This inference can be performed with the inference mechanism in FIG. 11.

In the example of FIG. 10, the flowchart 1000 continues to module 1006 for selecting the N products that are instance of the concepts with the N highest score.

In the example of FIG. 10, the flowchart 1000 continues to module 1008 for showing the selecting N products to the user.

As used herein, the term "embodiment" means an embodiment that serves to illustrate by way of example, but not limitation.

It will be appreciated to those skilled in the art that the preceding examples and embodiments are exemplary and not limiting to the scope of the present invention. It is intended that all permutations, enhancements, equivalents, and improvements, thereto that are apparent to those skilled in the art upon a reading of the specification and a study of the drawings are included within the true spirit and scope of the present invention. It is therefore intended that the following appended claims include all such modifications, permutations, and equivalents that fall within the true spirit and scope of the present invention.

We claim:

1. A computer-readable medium having stored thereon a set of instructions which when executed perform a method for recommending an item to a user, the method, comprising:

defining an ontology as nodes in a graph, the nodes including a scored node and an unscored node, the nodes in the graph representing concepts;

wherein, the scored node has an associated score based on a preference of the user for a concept represented by the scored node;

using a propagating function and the associated score of the scored node, to determine, for the user, a personalized score of the unscored node in the ontology;

wherein, the propagation function determines the personalized score of the unscored node based on a relationship of the unscored node and the scored node in the graph representing the ontology;

identifying, for the user, a qualifying concept from the concepts in the ontology for which the personalized scores have been computed, wherein, the qualifying concept that is identified from the concepts, is one that is associated a qualifying score among the personalized scores that have been computed for the concepts at the nodes of the ontology; and selecting the item which is an instance of the qualifying concept to be recommended to the user.

2. The method of claim 1 wherein a specific score associated with a particular concept in the graph depends on features of a particular item associated with the particular concept; wherein all nodes representing different instances of the particular concept are also associated with the specific score associated with the particular concept;

wherein concepts having identical features have an identical score.

3. The method of claim 1 further comprising, recommending the item to the user.

4. The method of claim 1 wherein the qualifying score is one of N-highest scores among the nodes in ontology represented by the graph.

5. The method of claim 1, further comprising,
computing an a-priori score of the scored node for use in the propagation function; wherein a formula for calculating the a-priori score of the scored node is $1/(n_c+2)$ with $n_c$ being a number of descendants of the scored node.

6. The method of claim 1 wherein, the item is selected based on novelty, wherein novelty is a measure of non-obvious recommendations made by one recommendation algorithm but not by another.

7. The method of claim 1, further comprising, determining novelty of the item using a novelty metric; wherein the novelty metric is measured using $(r_a|r_b)=(|cr_a|-cr_a \cap cr_b|)/N$.

8. The method of claim 1 further comprising, computing a distance between the scored and unscored nodes in the ontology.

9. The method of claim 8 wherein the distance is calculated by using a formula $$D(x,z) = -\frac{\log(1+2\beta) - \log(\alpha)}{\max D}.$$

10. The method of claim 1 wherein a similarity between two concepts in the ontology is calculated by determining the amount of score transferred between nodes that represent each of the two concepts in the ontology.

11. The method of claim 10 wherein a transfer of a score from a general concept node to a specific concept node is calculated using the formula $T(a,b)=S(b|a)/S(a)$.

12. The method of claim 1 further comprising, calculating an inference for an upward link from the scored node by multiplying the score of the scored node by a value, $\alpha$.

13. The method of claim 1 further comprising, using upward inference to determine the preference of the user for an unscored concept represented by the unscored node using the scored node using by $S(y|x)=\alpha S(x)$; wherein a is a coefficient of generalization for the scored node, if the unscored node represents a more general concept than the concept represented by the scored node.

14. The method of claim 1 further comprising, using downward inference to determine the preference of the user for an unscored concept represented by the unscored node using the scored node using the addition of a constant value, $\beta$, to the score of the scored node, if the unscored node represents a more specific concept than the concept represented by the scored node.

15. The method of claim 14 wherein the downward inference is calculated by $S(y|x)=S(x)+\beta$.

16. The method of claim 1 wherein an upward inference and a downward inference from the scored node comprises multiplication of the score of the scored node by a value, $\alpha$ and then the addition of a separate value, $\beta$.

17. The method of claim 16 wherein the upward inference followed by the downward inference is represented by $S(y|x)= \alpha S(x)+\beta$.

18. The method of claim 1 wherein the link connecting the scored node and the unscored node requires going upward and downward via a lowest common ancestor (LCA).

19. The method of claim 18, wherein a lowest common ancestor is determined as a node having a highest a-priori score.

20. A computer readable medium having stored thereon a set of instructions that when executed causes a computing device to perform a method comprising:
define an a-priori score for a first node of an ontology;
define an a-priori score for a second node of the ontology;
determine a lowest common ancestor node in the ontology connecting the first node and the second node;
defining an a-priori score for the lowest common ancestor node;
calculate an inference from the first node to the second node using the a-priori score for the first node, the a-priori score for the second node, and the a-priori score for the lowest common ancestor node;
calculate a personalized score for the second node by using the known personal score for the first node and a relationship of the second node and the first node in the ontology;
identify, a qualifying concept from concepts in the ontology for which personalized scores have been computed,
wherein, the qualifying concept that is identified from the concepts, is one that is associated a qualifying score among the personalized scores that have been computed for the concepts at the nodes of the ontology.

21. The method of claim 20 wherein the relationship includes an upward inference.

22. The method of claim 20 wherein the relationship includes a downward inference.

23. The method of claim 20 wherein the relationship includes a upward inference followed by a downward inference.

24. The method of claim 20 wherein the relationship between the first node and the second node includes going upward and downward via the lowest common ancestor (LCA).

25. The method of claim 20 further comprising, selecting\ the item based on novelty, wherein novelty is a measure of non-obvious recommendations made by one recommendation algorithm but not by another.

26. The method of claim 20 further comprising, calculating a personalized score for a user using a concept that is known to be liked by the user.

27. The method of claim 20 further comprising:
recommending an item which is an instance of the qualifying concept.

28. A computer-readable medium having stored thereon a set of instructions which when executed perform a method for recommending an item to a user, the method, comprising:
selecting, based on preferences of the user, an ontology from a set of predefined ontologies;
wherein, the ontology includes as nodes in a graph that represent concepts, the nodes including a scored node and an unscored node, the scored node having an associated score that is specific to the user;
determining a personalized score of the unscored node in the ontology using the associated score for the scored node and a structural relationship of the unscored node with the scored node in the graph;
identifying, for the user, a qualifying concept horn the concepts in the ontology for which the personalized scores have been computed,
wherein, the qualifying concept having a qualifying score among the personalized scores computed for the concepts at the nodes of the ontology;
wherein, the qualifying concept is used to select the item to be recommended to the user.

29. The method of claim 28, further comprising, recommending the item to the user.

30. The method of claim 28, further comprising,
receiving from the user the score that is associated with the scored node;
wherein, the scored node is associated with a personalized score that can take different values for different users.

31. The method of claim 1 further comprising, determining the preference of the user for the concept represented by the scored node using one or more user-specified ratings for instances of the concept.

32. The method of claim 31 further comprising, averaging the one or more user-specified ratings for use in determining the associated score of the scored node associate with the concept.

* * * * *